Figure 1:
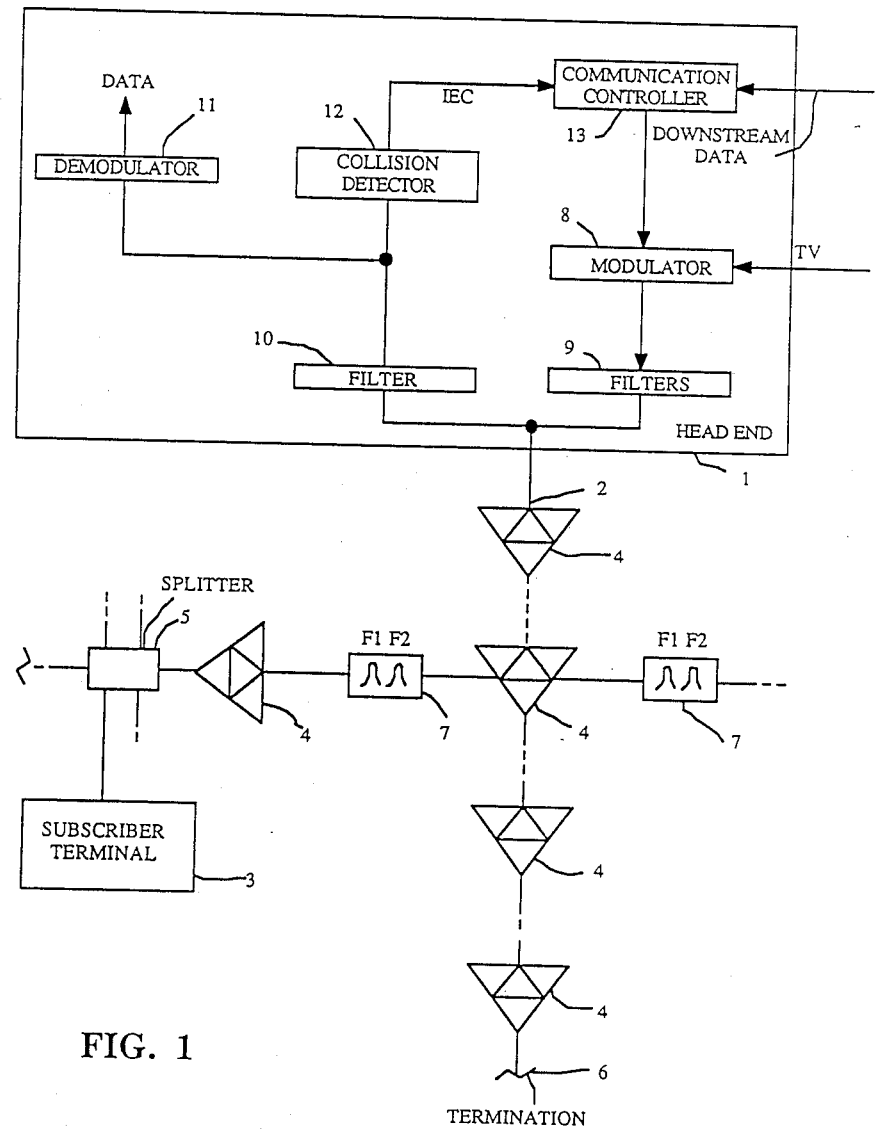

United States Patent [19]

Dufresne et al.

[11] Patent Number: 4,920,533
[45] Date of Patent: Apr. 24, 1990

[54] CATV SUBSCRIBER TERMINAL TRANSMISSION CONTROL

[75] Inventors: Michel Dufresne, Boucherville; Samir Sammoun, Brossard; Dave Gregory, Calgary; Jean-Paul Champagne, Brossard; Alain Tessier, Piedmont; Pierre Scott; Francois Methot, both of Montreal, all of Canada

[73] Assignee: Videotron LTEE, Montreal, Canada

[21] Appl. No.: 262,802

[22] Filed: Oct. 26, 1988

[30] Foreign Application Priority Data

Nov. 2, 1987 [CA] Canada ................................. 550764

[51] Int. Cl.⁵ .............................................. H04N 7/08
[52] U.S. Cl. ................................. 370/85.2; 370/94.1; 455/5; 358/86
[58] Field of Search ............... 370/85, 89, 94, 124, 370/69.1, 123; 325/45, 46; 455/3, 4, 5, 6; 340/825.5; 358/84, 86; 380/10, 20

[56] References Cited

U.S. PATENT DOCUMENTS

| | | | |
|---|---|---|---|
| 4,533,948 | 8/1985 | McNamara et al. | 455/5 |
| 4,536,875 | 8/1985 | Kume et al. | 370/85 |
| 4,553,161 | 11/1985 | Citta | 358/86 |
| 4,623,920 | 11/1986 | Dufresne et al. | 380/10 |
| 4,752,954 | 6/1988 | Masuko | 358/84 |
| 4,773,065 | 9/1988 | Kobayashi et al. | 370/85 |

Primary Examiner—Douglas W. Olms
Assistant Examiner—Alpus H. Hsu
Attorney, Agent, or Firm—Antonelli, Terry & Wands

[57] ABSTRACT

A bidirectional cable communication system comprising a head and, a bidirectional transmission network connected to the head end for transmitting signals downstream from the head end to a plurality of subscriber stations and for transmitting data signals upstream to the head end from the subscriber stations, means at the head end for detecting collisions between signals received from the subscriber stations and for generating a collision signal, means at the head end for transmitting downstream on the transmission system status bits of data signal indicative of the collision, whereby upon detection thereof by a subscriber station it can be enabled to cease transmission.

30 Claims, 6 Drawing Sheets

CATV SUBSCRIBER TERMINAL TRANSMISSION CONTROL

This invention relates to a bidirectional transmission system, and particular to one in which many subscriber stations can transmit data signals upstream to a head end.

Cable transmission systems typically carry various TV signals downstream in a tree-type network containing a main trunk and branches from the trunk, with subscriber terminals connected to drops via splitters to the branches. Typical networks are fabricated of coaxial cable, with repeater amplifiers spaced along the network to maintain the signals to be distributed above a predetermined minimum level.

It has been an objective to allow signals to be originated at the subscriber terminals for transmission upstream to the head end as requests for service, for selection of programs, responses to polling, etc. However various problems as will be described below have prohibited successful provision of services whereby signals could be originated at the subscriber terminals, passed upstream through the network, to the head end. Consequently such systems have utilized a separate transmission network, e.g. telephone system or only pseudo-interactive systems in which all programs or information signals are presented to the subscriber terminals and the programs or information are selected at the terminals. In both cases the signals originating at the subscriber terminals are not passed upstream in the system.

Two very significant problems prohibited successful two-way communication via the same CATV network. With typically thousands of subscriber terminals having the possibility of transmitting upstream within the same frequency band, there is a significant likelihood that several might be transmitting at the same time. The result at the head end is pollution of the signals received from one subscriber terminal by signals received from other simultaneously transmitting subscriber terminals. The problem is made worse by the existence of various time delays within the system presented to the signals transmitted from various subscriber terminals due their locations being at various different line lengths (transmission distances) from the head end.

The second problem involves noise gathering. It will be appreciated that significant upstream noise is gathered from the various branches feeding into a single trunk, which noise often can be significantly higher than the signal level transmitted by a single subscriber terminal The problem is increased with the use of two-way amplifiers in the system, those amplifying in the upstream direction attempting to amplify whatever signals are applied to their inputs, e.g. noise. Such amplifiers typically use automatic gain controls, which operate with maximum gain at the time of minimum signal, thus outputting maximum noise collected from all branches feeding into that amplifier.

The present invention is a cable transmission system which substantially reduces or eliminates the problem of collisions between signals from various subscriber terminals arriving at the head end at the same time. Also disclosed is means for substantially reducing or eliminating the problem of noise gathering.

The head end in the cable system of the present invention provides television signals as in a normal CATV system, but also transmits data signals in a separate downstream data channel. The signals in the data channel are transmitted in packets divided into time slots, the time slots being separated by a special byte of data referred to herein as a status byte. The status byte is formed of bits which are referred to herein as "busy bits".

The downstream data signal is frequency multiplexed with the TV signals, using a separate channel, and is transmitted downstream through the network to the subscriber terminals. The subscriber terminals each detect the busy bits and after decoding, determine whether the network is idle, busy, or whether a collision has occurred and if desired, a priority level. Each subscriber terminal if it has data to transmit, transmits back to the head end, with a certain probability factor. The probability factor is modified depending on whether the busy bits which the terminal continuously receives indicates a collision (which indicates that another subscriber terminal has transmitted, polluting its data signal). If a collision is detected, the probability factor is changed, and the subscriber terminal retransmits the data from the time slot which has been polluted at a time dependent on the probability factor.

The transmitting subscriber terminal also counts collisions, i.e. the number of collisions indicated by the busy bits. If the number of collisions is in excess of a predetermined threshold, it recycles the probability factor and retransmits the entire data sequence at a time which is controlled by the new probability factor.

Any subscriber terminal is inhibited from transmitting if the busy bits which it receives indicate that the network is busy in the upstream direction. Thus the collision effect occurs following the time that the busy bits indicate that the upstream data channel is idle, data has begun to be transmitted by more than one subscriber terminal, and prior to the time that subscriber terminals receive busy bits from the head end which indicate that the upstream channel has been seized, i.e. is busy. Thus the collision effect occurs typically at the initiation of a new transmission by more than one subscriber terminal when the channel is idle, increasing with increasing traffic.

The probability of transmission factor is varied using a random number generator, which, coupled with the likelihood of different time delays for signals transmitted from the various subscriber terminals within the system, decreases the likelihood that more than one would transmit at the same time, than if the probability factor was varied in the same way at each subscriber terminal Further, since the number of collisions causes a decreased probability that a subscriber terminal is allowed to transmit, the heavier the traffic, the more the likelihood that a subscriber terminal is automatically caused to wait for a longer random period to transmit. The system thus automatically compensates and adjusts for increased traffic.

The problem of noise gathering is substantially solved by causing each subscriber terminal to transmits its data using frequency shift keying at two spaced frequencies, and by using a narrow band filter, having two passbands just sufficient to pass the two frequencies, in the upstream direction in each branch of the network. The downstream data signals are unaffected The filters thus block virtually all noise except a small amount in the two narrow passbands from passing upstream to the head end. The filters are preferably remotely addressable so that they can be controllably switched to pass signals or upon receipt of an upstream signal. It has been found that this structure successfully inhibits noise gathering.

The prior art problems of collision of upstream signals in a bidirectional cable communication system and noise gathering are thus substantially overcome Briefly, the invention is a directional cable communication system comprising a head end, a bidirectional transmission network connected to the head end for carrying signals downstream from the head end to a plurality of subscriber stations and for carrying data signals upstream to the head end from the subscriber stations. A circuit at the head end detects collisions between signals received from the subscriber stations and generates a collision signal, and a further circuit at the head end transmits downstream on the transmission system a status byte of data signal indicative of the collision, whereby upon detection thereof by a subscriber station it can be enabled to cease transmission.

Preferably the head end collision detector also includes apparatus for detecting whether or not signals are being received from any subscriber station and for generating a busy or idle status byte signal respectively, the byte transmitting circuit generating the byte of data signal indicative of the collision, the idle, or the busy status.

It is also preferred that the status byte of data should be transmitted separating time slots of a downstream data signal, in which a maximum round trip propagation trip delay, being the sum of the delays of all components in the transmission loop to the longest delayed end of the network in both downstream and upstream directions, defines the time period between successive status bytes which should be at least as long as said propagation delay.

The invention is also a subscriber terminal for use in a bidirectional cable communication system comprising apparatus for repetitively receiving a data signal from a bidirectional transmission network comprised of a status byte indicative of the status of the network including signal collision, busy or idle, and preferably priority, apparatus for formulating and storing a data signal to be transmitted via the network to the head end, apparatus for transmitting the data signal to the head end via the network, apparatus for controlling the apparatus for transmitting, the apparatus for controlling comprising apparatus for receiving the status byte and for enabling transmission of the data signal with a predetermined probability P, apparatus for counting the number of signal collision status signals received and for adjusting the probability P in accordance therewith.

It is preferred that the apparatus for controlling inhibits transmission for a period of time if the number of signal collision status signals received exceed a predetermined maximum, thereupon reinitiating retransmission of the complete data signal.

Figure 4:
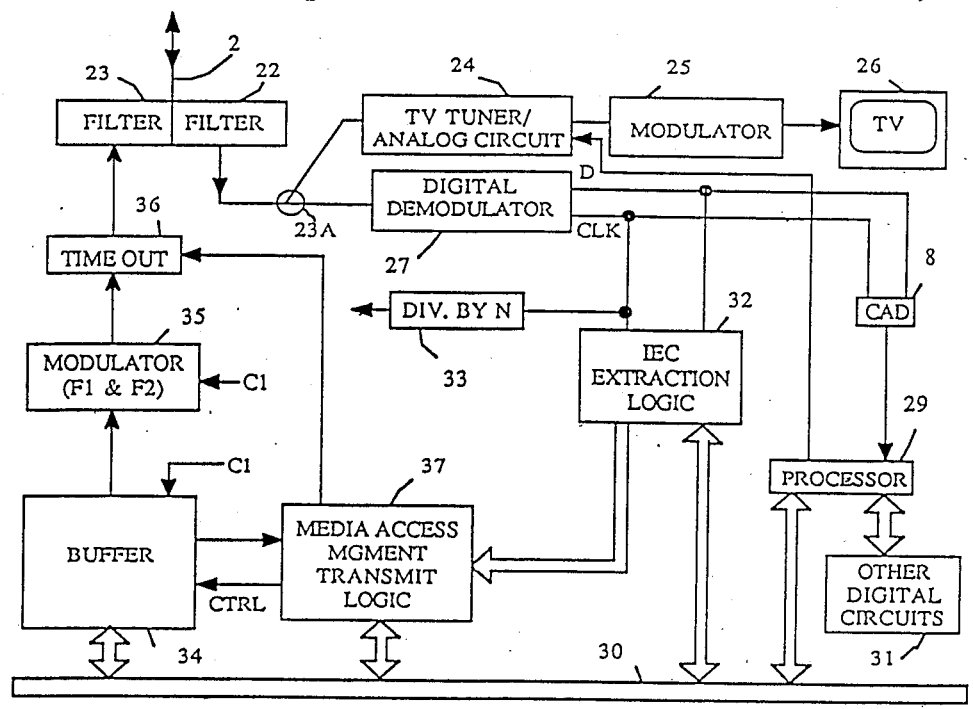
Figure 3:
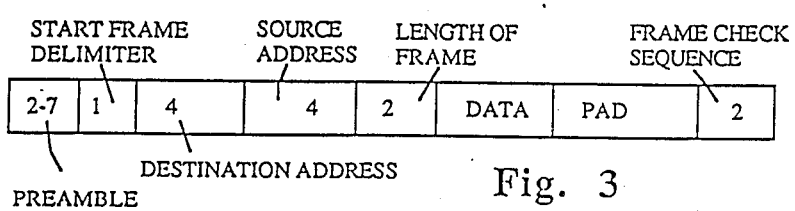
Figure 2:
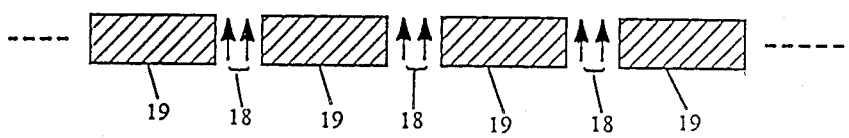
Figure 5:
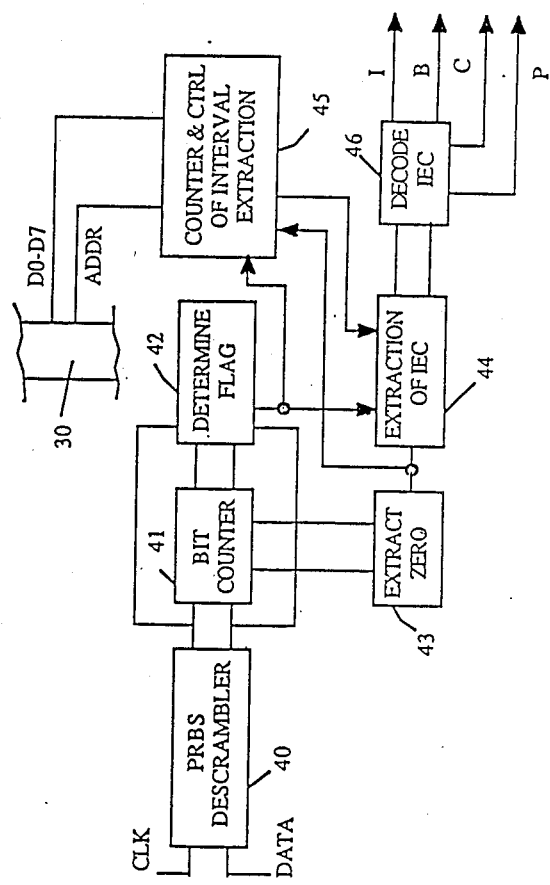
Figure 6:
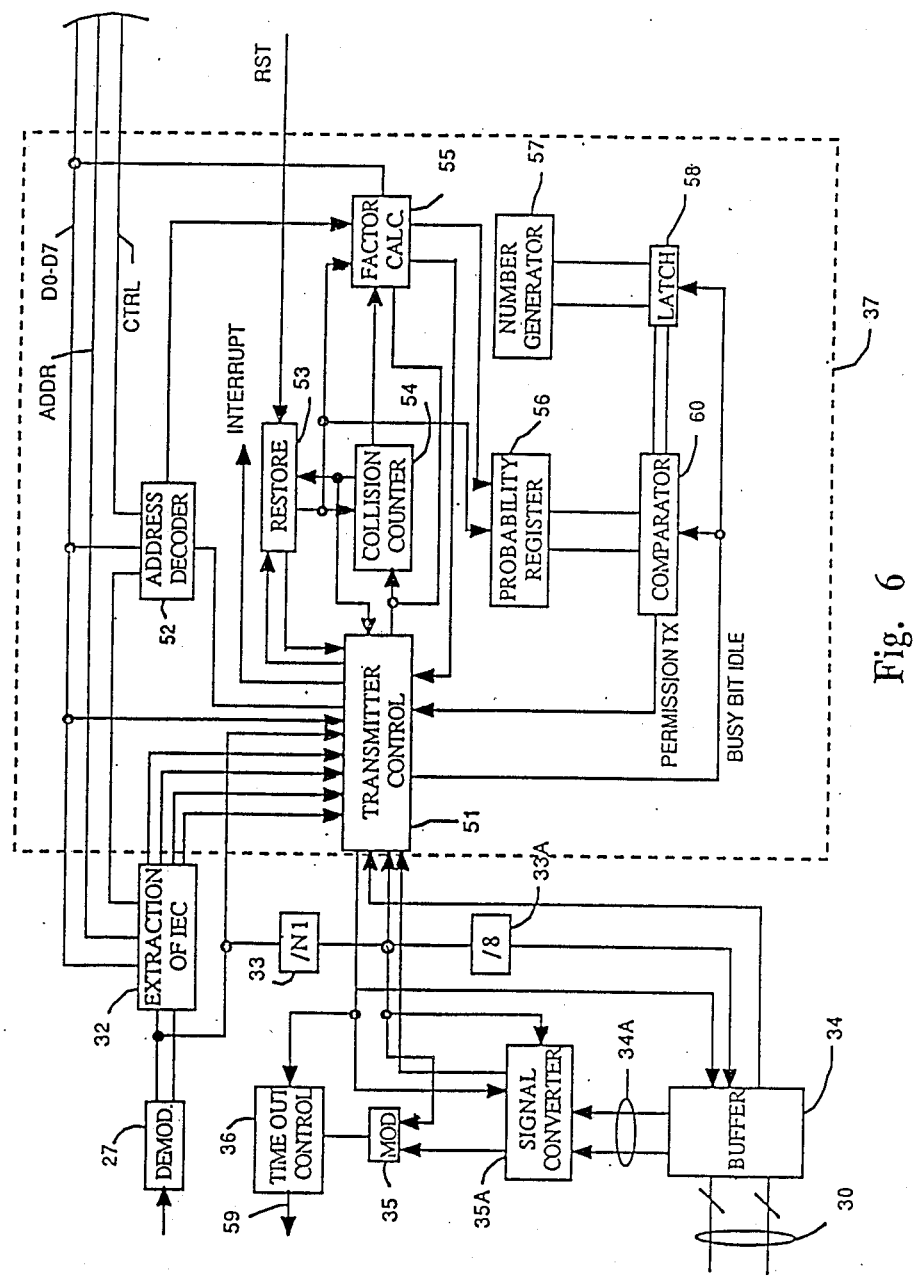
Figure 7A:
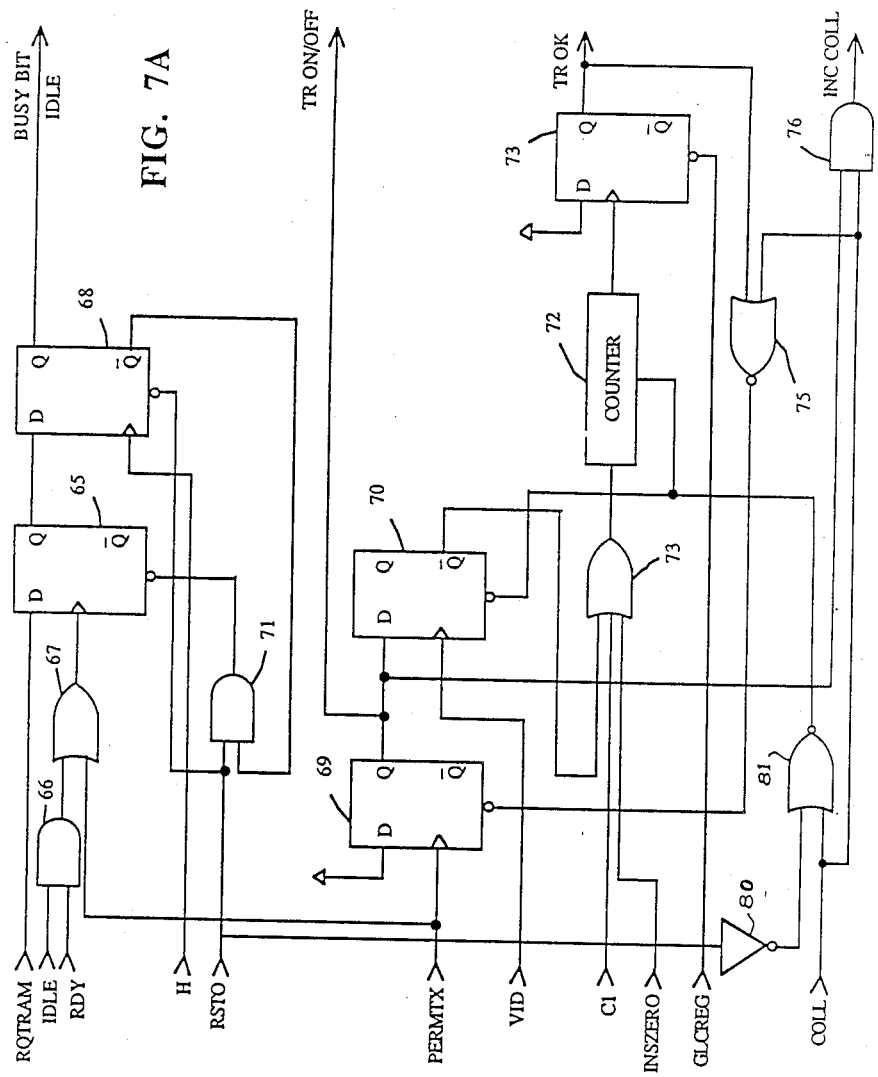
Figure 7B:
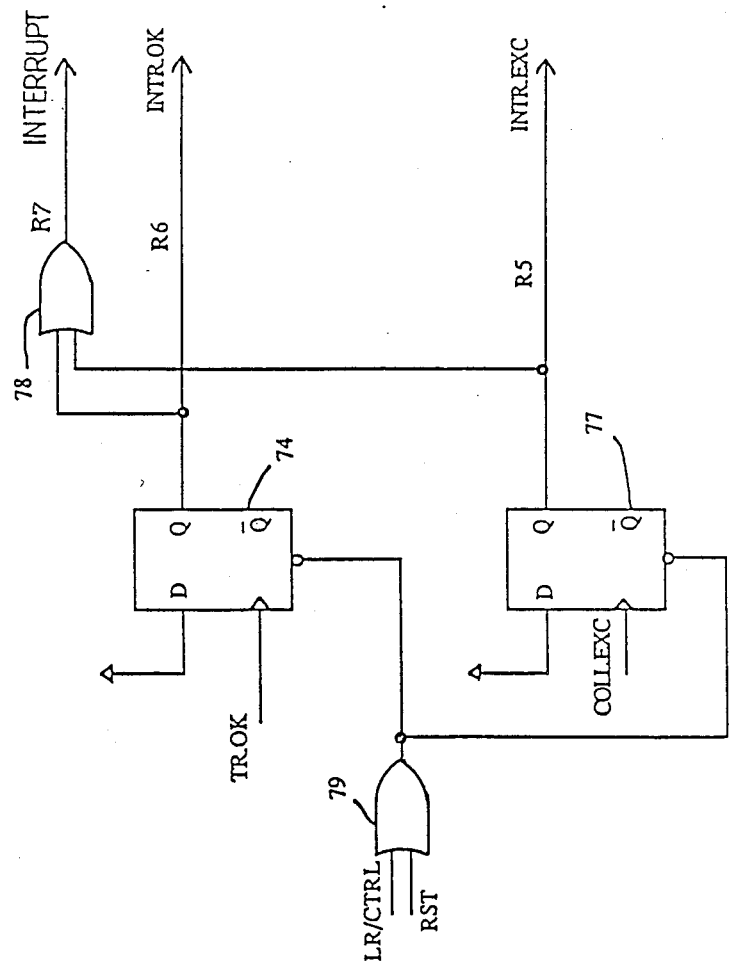

A better understanding of the invention will be obtained by reference to the detailed description below of a preferred embodiment, with reference to the following drawings, in which:

FIG. 1 is a block diagram of a bidirectional cable communication network in accordance with the invention, FIG. 2 illustrates the downstream data stream with time, FIG. 3 illustrates a data packet with time, FIG. 4 is a block schematic of a subscriber terminal in accordance with the invention, FIG. 5 is a block diagram of the extraction logic circuit shown in FIG. 4, FIG. 6 is a block diagram of the media access circuit shown in FIG. 4, and FIG. 7A and 7B form a schematic of the control transmitter at the subscriber terminal.

FIG. 1 illustrates a bidirectional cable communication network in accordance with the present invention. However it should be noted that the invention could be used in a star type network, a local area network or other kinds of networks. In the present embodiment, a system is comprised of a head end 1 which communicates via a wideband communication medium such as a coaxial cable 2 with a plurality of subscriber terminals 3. The terminals and head end 1 communicate via a network, such as a well known tree network, but could be another form of non-looping network. The tree network is comprised of bidirectional amplifiers 4 and splitters 5 which are connected via drops (not illustrated) to the subscriber terminals. The network is terminated at a matching impedance 6 in a well known manner.

For ease of description only one subscriber terminal 3 has been shown However it should be clear that subscriber terminals can be connected to splitters distributed along the network in a well known manner.

In a conventional network, amplifiers 4 will be unidirectional in the downstream direction, whereby they carry a plurality of television channels. The present invention, however, is directed to the class of networks which also carry data signals. Such signals have been provided in networks which carry data signals which are to be reconstructed into computer generated pictures, computer programs, control signals for descramblers, etc. Such data signals are sometimes carried in the vertical interval of a television channel, but in the present invention they are carried by a separate high speed data channel. Consequently the amplifiers 4 should have the capability of transmitting the data channel in the downstream direction.

In order to order specific services, the subscriber terminal 3 typically has a keyboard which generates signals, ultimately resulting in command or other data signals to be transmitted upstream to the head end. Several problems have characterized this upstream transmission, with the result that few, if any such practical systems exist. The present invention provides means for reliably transmitting data upstream from a large number of subscriber terminals. It should be noted, however, that bidirectional amplifier 4 should also have the capability of transmitting the data signals received from the subscriber terminals in the upstream direction. Such amplifiers exist and the present invention is not specifically directed to them.

Problems associated with upstream transmission include noise gathering and data collisions. Noise gathering involves the generation of noise from the many branches of e.g. the tree network, which all feed into the main trunk or port of the system. The noise is amplified by each of the amplifiers, resulting in a noise level at the head end which is excessive.

Data collisions exist when more than one subscriber terminal transmits data signals in the upstream direction which arrive overlapping in time at the head end. Clearly this causes corruption of all data signals which overlap.

The solution to the problem of avoidance of noise gathering is not the subject of the present invention. In the present invention the problem of collisions is solved, by the use of so-called "busy bits" which are transmitted from the head end downstream to the subscriber terminals. A byte of two busy bits defines the busy or idle quality of the channel. The two bits can of course define four different states, i.e. idle, busy, collision and a fourth state which can be used as a priority indicator or other information. However other number of busy bits can be used if desired.

In general, the head end transmits on a regular basis, busy bits indicatinq an idle channel, preferably using AM modulation of a courier. If it receives data signals, it changes the character of the busy bits to define a busy condition. Upon analysis of the data, the head end detects collisions between received data signals, and if it detects such collisions, it changes the busY bits to indicate a collision condition.

The subscriber terminal, on the other hand, transmits the upstream data, preferably in a frequency shift keyed form (e.g FSK) It constantly monitors the downstream busy bits, and transmits when the channel is indicated as being idle (assuming that there is some data to transmit). If, while transmitting, it detects collisions between busy bits, it stops transmitting, waits for a period of time as will be described below, and then retransmits the signal.

In order to minimize noise on the trunk filters 7 are connected in series with various branches of the distribution network, each filter having sharply defined narrow bandpasses for the upstream frequency shift data, each filter being connected in the transmission upstream direction. This reduces all upstream noise except that which is in the bandwidth of the filter. To improve the upstream data transmission performance preferably filters are used which will remain shut off until they sense the presence of upstream carrier signal in the actual bandwidths of the filter, whereupon they will quickly open; e g. within microseconds, allowing the upstream data signal to pass. In addition, the filters could be addressable from the head end to open and close, for network maintenance purposes. The filters are transparent in the downstream direction; the television signals and downstream data signals pass through these filters in the downnstream direction.

Within the head end a source of television signals is connected to a modulator 8, which has its output connected through channel filters 9 to the coaxial cable. Television signals are thus applied to the network as in the prior art.

Receive bandpass filter 10 has its input connected to the coaxial cable 2, and its output to a data demodulator 11. The frequency keyed data transmitted from subscriber terminal 3 thus is output from demodulator 11.

Also connected to the output of filter 10 is a collision detector 12. Collision detector 12 detects the presence of overlapping bits preferably by means of envelope detection. Since that type of collision detection must be very fast, it is preferably done in broadband.

Logic within collision detector 12 also provides the pair of bits which is referred to herein as the busy bits, designating the four states referred to above, idle, busy, collision and priority or undefined. These bits, designated as IEC or channel state indicator are applied to a communication controller 13. Here the busy bits are interleaved (multiplexed) into a downstream data stream, which is applied to modulator 8. Modulator 8 applies the combined data stream into a high speed data channel, from which the output is treated as described earlier with reference to the television signal source.

The busy bits preferably are sent through the downstream channel at 4 M bits per second periodically at the beginning of each time slot, as shown in FIG. 2 which illustrates the downstream data stream with time. The busy bits illustrated by arrows 18 therefore define the time period of each time slot. The time slots can be programmed at the head end each containing e.g. 128, 256, 512, 1024 bits, for example, the bit duration now preferably being 0.25 microseconds. The downstream data sent within the time slot is indicated as reference 19.

The communication controller also ensures that downstream data packets are not transmitted during a busy or collision state of the network. It also switches off the transmitter if it transmits for too long a period, e.g. if it transmits over a predetermined maximum packet size. The transmitter is thus locked and timed out.

It is important that the period of time that separates the transmission event of consecutive pairs of busy bits should be equal to or greater than the maximum round trip propagation delay of the network. This delay is the sum of the delays of all of the components which constitute the transmission loop with maximum cable length, going first to the longest delayed end of the network, in both directions.

Each data packet sent from the head end should preferably also be equal to or longer than one time slot period. A typical packet format is shown graphically in FIG. 3; it can be formed for example by a 2-7 byte preamble, followed by a one byte start frame delimiter followed by a 4 byte destination address, followed by a 4 byte source address, followed by a two byte frame length indicator, followed by an indeterminate number of bytes containing the data to be transmitted, following by an indeterminate number of padding bytes (if necessary), followed by a two byte frame check sequence Turning now to FIG. 4, a block diagram of the preferred form of subscriber terminal 3 shown in FIG. 1 is illustrated. Coaxial cable 2 from the network is connected to both downstream bandpass filter 22 (which is similar to filter 9) and upstream bandpass filter 23, the latter of which can form two narrow passbands just sufficient to pass the two frequencies of the frequency shift keyed modulated output signal to be generated in the subscriber terminal The output of filter 22 is carried via splitter 23A to TV tuner/analog circuit 24. Circuit 24 may consist of a tunable down-converter, pay TV descrambler or the like. The output of the circuit 24 is applied to modulator 25 for application to a TV set 26.

The output of filter 22 is also connected via splitter 23A to the input of a digital demodulator 27, which demodulates the data stream in the digital channel. Digital demodulator 27 provides data and clock output signals on corresponding output lines, in a well known manner. These signals are applied via a CAD circuit 8 where they are translated into parallel in a known manner, and applied to data and clock inputs of a central processor/memory circuit 29. A data and address bus 30 communicates with the central processing unit/memory circuit 29. Other peripheral digital circuits 31 associated with the subscriber terminal are also connected to the central processing unit/memory circuit 29, e.g. to control a video display generator, to monitor alarm circuits, etc.

The data and clock lines output at the digital demodulator are also connected to corresponding inputs of busy bits (IEC) extraction logic circuit 32, which is also connected to bus 30. A divide by N circuit 33 is connected to the clock line, its output being a clock signal $C_1$. The divide by N circuit thus generates un internal clock signal C1 from the clock line, and is thus desired from the downstream data signal.

A buffer 34 is connected to the bus 30, for receiving data signals from processor circuit 29 for transmission to the head end. The output of buffer 34 is connected to frequency shift key modulator 35, for modulating the output signal from buffer 34 into a frequency shift keyed signal within the passband of the upstream data channel. The output of modulator 35 is applied through a time out circuit 36 which controls the transmission interval of the upstream signal. The output of time out circuit 36 is applied to upstream bandpass filter 23, from which it is applied to coaxial cable 2 for transmission to the head end.

A media access management transmit logic circuit 37 (MAC) (controlling means) is connected to bus 30, and has other inputs connected to the extraction logic circuit 32 for receiving the busy bits. The MAC circuit is also connected to a control input of buffer 34 and to a control input/output of time out circuit 36. The purpose of the MAC circuit 37 is to detect the busy, idle or collision status of the network by monitoring the busy bits, and to control the transmission and the timing of the transmission of signals stored in buffer 34 to the head end.

The digital channel signals are received from the head via cable 2, are filtered in filter 22 and are applied to digital demodulator 27. The resulting data and clock signals are applied to processor 29. A keypad or other means operating through other digital circuits 31 communicates with processor 29 to cause it to formulate data signals for transmission to the head end. The mechanism for formulating these signals in the CPU/memory is not the subject of the present invention as techniques known to persons skilled in the art can be used. Suffice to say that once the signals are formulated, they are passed via bus 30 to the input of buffer 34 where they are stored.

The IEC extraction logic circuit 32 detects the busy bits on the data and clock lines at the output of demodulator 27. The busy bits are presented to the MAC circuit 37.

MAC circuit 37 operates using an internal algorithm to be described below If the MAC circuit receives busy bits which indicate a busy channel or a collision, it waits until the arrival of the next busy bits, and continues monitoring the busy bits state. If the busy bits indicate a free channel, the MAC circuit decides to transmit with a probability P, or decides not to transmit with a probability $(1-P)$ and thus will wait until the arrival of the next set of busy bits whereupon it will operate of a probability of transmission adjusting algorithm.

The MAC circuit upon deciding to allow transmission, applies a control input to buffer 34, which causes it to begin outputting its stored packet At the same time the MAC circuit monitors the busy bits. If the busy bits received, while the circuit is transmitting, indicate collision, which means that one or more other transmitters are transmitting during the same time period, it immediately controls buffer 34 to halt its transmission A collision counter is also incremented within the MAC circuit.

If the number of collisions indicated on the collision counter exceeds a predetermined maximum, the enitre packet transmission process is stopped. The packet is returned to the buffer 34, where it waits a period of time prior to transmission again as controlled by the MAC circuit.

If the number of collisions already occurred is less than the maximum, the packet transmission probability P is reduced by a factor K (where $P = P/K$) to a minimum retransmission probability value Then it waits until the next pair of busy bits at whick time it repeats the examination of the next set of busy bits.

If the next pair of busy bits does not indicate a collision, it will necessarily indicate a busy state, since the subscriber station itself is transmitting. This means that the local subscriber terminal has uniquely captured the channel. Transmission is reinitiated and continued until the end of the packet, after which the channel will be declared free. The collision counter is then initialized to zero, and its transmission probability P to 1.

The extraction logic circuit 32 and MAC circuit 37 of FIG. 4 will now be described in detail. Turning to FIG. 5, the busy bit extraction logic 32 circuit is shown in block diagram. The data and clock lines are connected to a descrambler circuit 40, for descrambling if necessary, if the downstream data signal has been received scrambled. Descrambler 40 is a mirror image circuit of the head end scrambler, which can be included as part of communication controller 13 (FIG. 1). The output signals of descrambler 40 are clock and data signals which are applied to the data and clock inputs of bit counter 41. Counter outputs of bit counter 41 are connected to flag determining circuit 42, which determines the beginning of a packet from the contents of counter 41, and provides on its IND output a pulse or leading edge of a pulse which indicates the presence of the beginning of a received data packet.

The data and clock outputs of bit counter 41 are connected to zero extraction circuit 43. This circuit is used in a well known manner to remove zeros which may have been inserted in the communication controller 13 at the head end to distinguish the value of long bytes which all consist of ones. Thus zero extraction circuit 43 reconstitutes the original data. This corrected data is applied to a status byte extraction circuit 44.

The corrected data signal is also applied to a counter and interval control circuit 45, which is connected via address bus ADDR and data bus D0-D7 to bus 30.

Bus 30 is, as described earlier connected to processor 29. The time slot interval is determined by the CPU and stored in its memory, and this data is sent via the bus 30 to circuit 45 which in turn presents a control signal on the CTRL line to extraction circuit 44. The time slot can be found by changing the interval on the extraction circuit until the received packet check sum matches. Extraction circuit 44, which can be a programmable register, thus can receive the data within a time slot and provide the bits associated with the time of the busy or status bits to its output terminals. Those output terminals are connected to a decode IEC circuit 46, which is a two bit decoder, for decoding the busy bits. The four output terminals of decode IEC circuit 46 thus reflect the four states of the two bits constituting the busy or status bits: idle, busy, collision state, and a priority or other fourth state, which terminals are correspondingly labelled in FIG. 5. The lines connected to those terminals are connected to the MAC circuit 37.

Turning now to FIG. 6, media access circuit 37 is shown within the dashed lines in block diagram, along with additional details of circuits already shown.

The busy bit extraction circuit 32 is shown having its data and clock inputs connected to the output of digital demodulator 27 reproduced from FIG. 4. Its output leads idle, busy, collision and priority are connected to the input of a transmitter control 51. The clock input to busy bit extraction circuit 32 is also connected to an input of the transmitter control 51. The address and control leads of bus 30 are connected to an address decoder 52, the decoded output thereof being connected to transmitter control 51. The data leads D0–D7 of bus 30 are connected to the busy bit extraction circuit 32 as well as to the transmitter control 51. The transmitter control includes an interrupt output, which is connected to the central processor in a well known manner, a transmit accomplished (TR.OK) lead connected to a restore circuit 53, an input from the restore circuit, an increment collision counter output INC.COL connected to a collision counter circuit 54, a COLL.EXC input from the output of the collision control circuit, a ready RDY input, a transmit permission PERMISSION TX input, and IECLIV (busy bit idle indicator) output lead, a transmit on-off TRON/TROFF (output), a VID, clock C1, INSZERO and a TIMEOUT inputs Details of the transmitter control are shown in schematic form in FIGS. 7A and 7B.

The restore circuit 53 has a reset input RST from the microprocessor, and an output connected to the input of the collision counter 54 to an input of a back-off factor circuit 55. Outputs of the address decoder 52, the collision counter 54 and the increment collision counter lead INCCOL are connected to inputs of the back-off factor circuit 55. Outputs of the back-off factor circuit 55 are connected via a ready lead RDY to the transmitter control 51, and via a SHIFT CLOCK lead to an input of a probability register 56. The restore circuit 53 output which is connected to the collision counter and back-off factor circuits is also connected to an input of the probability register 56.

A random number generator 57 has its output connected to latch 58, which has a latch enable input connected via the busy bit idle lead from the transmitter control 51. The same lead is connected to the compare enable input of a comparator 60, which has its two sets of inputs connected to the output of latch 58 and probability register 56 respectively. The output of comparator 60 is a transmit permission lead PERMISSION TX.

Buffer 34 (reproduced from FIG. 4) is connected to the address and data leads of bus 30. The output of buffer 34, consisting of parallel data leads 34A is connected to the input of a signal converter circuit 35A, considered to be part of modulator 35 in FIG. 4. The output of circuit 35A is connected to the input of FSK modulator 35, the output of which is connected to the time out control circuit 36, which has its output lead 59 connected to filter 23. The TR ON/TR OFF output of transmitter control 51 is connected to signal converter circuit 35A and to time out control 36. A lead INSZERO for carrying an indication that a zero has been inserted is connected from circuit 35A to control transmitter 51. The clock divider 33 (reproduced from FIG. 4) has its output connected to clock Cl inputs of modulator 35, circuit 35A and control circuit 51, as well as through a divide by 8 circuit 33A to a byte clock input of buffer 34.

The operation of the circuit described above is as follows. The central processor forms a packet of data which is to be transmitted to the head end (except for presumable flag, CRC and zero insertion if necessary) and PRBS conversion. The buffer 34 is then loaded with the packet from the microprocessor via bus 30. The transmitter control 51 is informed via the bus that the packet is ready for transmission, designating the portion of the buffer which has been loaded.

The transmitter control monitors busy bits received from the busy bit extraction circuit 32. If the busy bits indicate an idle condition, the transmitter control transmits a command on the busy bit idle lead connected to latch 58 to freeze the output signal of random number generator 57 in latch 58. The output of latch 58 is received by comparator 60 which compares its received number with the output signal of probability register 56.

If the number in the probability register is greater than that of the random number generator, then an enable signal is applied to the transmit permission lead PERMISSION TX to enable transmission. (Rather than using comparison of a random generator output signal with that of a probability register, a geometric distributor could have been used. Such a distributor could schedule a transmission with prohibiting 1 after e.g. X number of time slots, where X is generated according to a probability register value using a geometric distribution algorithm).

Once the transmit permission enable signal has been received (PERMISSION TX on), the control transmitter 51 applies a transmit enable signal on the TRON/TROFF lead, and also informs the buffer 34 via the bus to begin tansmitting data via signal converter circuit 35A.

Circuit 35A converts the parallel input signal from buffer 34 into serial form, and inserts the preamble, flag, zeros and frame check sequence (CRC) into the packet in a known manner, converted into a PRBS sequence, and transmits the data through modulator 35 where it is minimum frequency shift keyed, and through time out control circuit 36 and lead 59 to narrow FSK signal passband filter 23, from which it is applied to the coaxial cable 2 (FIG. 4). In the meantime the transmitter control monitors the busy bits received. If it detects either busy or idle, it continues to enable transmission. However if it detects a collision busy bit signal, the TRON/TROFF signal is changed to "inhibit", which stops the time out control 36, and causes the buffer to re-initialize to start the next transmission from the beginning. It also sends a signal to increment the collision counter 54. The collision counter 54 compares whether the number of collisions exceeds a predetermined maximum number of collisions (e.g. 16). If it does exceed this maximum it provides a "transmit collision" signal on the TRCOLL lead which is applied to the restore circuit 53. The restore circuit in response initializes the backup factor circuit 55, sets the collision counter 54 to zero, and the probability register 56 to one. It also provides a signal to the transmitter control 51 to write the present status into the transmitter control, and interrupts the microprocessor to cause it to read the register storing the status i the transmitter control 51. The microprocessor then controls the transmitter control whether to retransmit, to wait, etc.

If the number of maximum collisions was not exceeded, the probability register 56 is decremented by the factor K, referred to herein as a back-off factor, by the backup factor circuit 55 under control of the collision counter. The probability register is shifted by the back-off factor (e.g. 1, 2 or 3) and a ready RDY signal is sent back to the transmission control 51 (very quickly, in less than 1 nanosecond). The transmission control 51 then waits for the next set of idle busy bits, then repeats the process.

The variation of probability causes the likelihood of transmission to be reduced. Therefore it may be seen that with an increase in traffic in the network, causing more collisions, the probability of the transmission by any of the subscriber stations is reduced, automatically controlling the traffic. The more subscriber stations that attempt to access the network over a certain maximum which causes collisions, the more the speed of access of each of the stations to the network is reduced.

Detailed operation of the transmitter control will now be explained With reference to FIGS. 7A and 7B, which form a schematic of its structure. An RQTRAM input lead from the microprocessor, connected to the D input of flip-flop 65 is set ON by the microprocessor to indicate that a frame has been loaded into the buffer 34, and is ready to transmit. The idle lead from the busy bit extraction circuit 32 receives a pulse therefrom which enables AND gate 66 provided that the RDY lead which is connected to the second input of AND gate 66 is ON. The RDY lead is kept ON by the back-off factor circuit 55 except during the time that the incrementation of the collision counter and the probability back-off process is under way following detection of a collision.

The resulting output pulse from AND gate 66 is passed through OR gate 67 (assuming that the input PERMTX from the transmission permission lead output from comparator 58 is off), causing operation of flip-flop 65. The Q output of flip-flop 65 is connected to the D input of flip-flop 68 and this flip-flop is also operated The result sets the busy bit idle lead ON. Since that lead is connected to the enable inputs of latch 58 and comparator 60, the output of random number generator 57 is latched and is compared with the probability value output from register 56. The permission transmit lead PERMTX is thus set ON, if the output of the random number generator is less than or equal to the probability of of transmission value in the probability register.

If the permission transmit lead PERMTX is on, it blocks, through OR gate 67, any further action of the signal on the idle lead through AND gate 66. However it also causes operation of flip-flop 69, which has its Q output connected to the TRON/TROFF lead and to the data input of flip-flop 70. The Q output of flip-flop 69 thus establishes the transmit ON or transmit OFF signal on the TRON/TROFF lead, to start the transmission.

The $\overline{Q}$ output of flip-flop 68 is used to reset flip-flop 65 through AND gate 71.

If the random number generator output signal is greater than that of the probability register value, then the transmit permission lead PERMTX signal stays OFF, allowing the next busy bit idle siqnal on the IDLE lead to pass through AND gate 66.

If the above process results in the signal on the TRON lead to be on (the Q output of flip-flop 69 to be on), then transmission is enabled, since the TRON signal is applied to the signal, converter circuit 35A and time out control 36, as well as to the buffer 34. In the meantime, if a signal on the collision lead COLL from the busy bit extraction circuit 32 indicates that a collision has not occurred, transmission continues until the last byte in the buffer is transmitted. Following this a signal on the VID lead which is input from the buffer 34 goes ON, which starts a counting process to allow the last bit to leave the time out circuit 36 to the network. The VID lead enables modulo 32 counter 72 via the $\overline{Q}$ lead of flip-flop 70 through OR gate 73 to the input of counter 72. Following the count, counter 72 operates flip-flop 73A which sets a signal on the TROK lead to high, which is applied to the clock input of flip-flop 74, thus saving its state. The TROK lead is also connected to one input of NOR gate 75, the output of which is connected to the reset input of flip-flops 69. Flip-flop 69 is thus reset which causes the TROFF lead to change state which in turn resets the signal converter circuit 35A, time out control 36 and the buffer circuit.

If a collision occurs, the COLL lead connected from busy bit extraction circuit 32 goes high. The COLL lead is connected to the other input of NOR gate 75, and thus when the COLL lead goes high flip-flop 69 changes state, thus turning the Q output off. This causes the TRON/TROFF lead to turn off, which again resets the signal converter circuit 35A, time out control 36 and buffer 34. In addition, an increment collision signal is generated on the INCCOLL leads by the COLL signal being applied to one input of AND gate 76 (if transmission is underway, the Q output of flip-flop 69 is high) which output is connected to the other input of AND gate 76. The INCCOLL lead is connected to the collision counter 54 referred to with reference to FIG. 6. The collision counter is thus incremented, INCCOLL causes the RDY signal on the RDY lead to go off; this lead is connected to the second input of AND gate 66. The result is the inhibiting of any signal level on the busy bit idle lead until a check of the number, of collisions that has taken place, and, if a predetermined number or value is not exceeded, a backing off of the probability factor by shifting of the probability register once this has been accomplished, the RDY signal is set on, allowing the busy bit idle lead to be activated upon arrival of idle busy bits on the IDLE lead. If the number of collisions has been exceeded, this state is saved in the transmitter control register R5 as described below.

The COLLEXC lead output from the collision counter 54 (FIG. 7B) is connected to the clock input of flip-flop 77. The Q outputs of flip-flops 74 and 77 are connected to inputs of OR gate 78, the output of which is the interrupt lead INTR. Thus if the transmission is completed without collision state on the TROK lead or the number of collisions is exceeded on the COLLEX lead, an interrupt signal appears on the INTR lead via gate 78. This interrupt lead at the microprocessor causes the CPU to check the state of the transmitter control. The Q output of flip-flop 74, designated by lead INTROK and the Q output of flip-flop 77, designed by lead INTREXC can be connected into registers for checking by the microprocessor. An on signal on the INTREXC lead designates that the number of collisions has exceeded the predetermined value and a signal on the INTROK lead indicates that transmission has been completed without collision. Nor gate 81 has its output connected to the reset inputs of counter 72 and the flip-flop 70 and has one input connected to the COLL lead and the other to an inverter 80 having its input connected to the RSTO lead with an input to AND gate 71. This ensures the flip-flop 70 and counter 72 are not reset with the COLL signal high or the reset signal on RSTO high.

Other input leads to the circuit are the clock Cl lead into OR circuit 73, the INSZERO lead into OR gate 73, and reset leads into the reset inputs of flip-flops 74 and 75 via OR gate 79 from the RST lead (from the microprocessor) and the LRCTRL lead from the bus. The reset clock and insert zero inputs will be understood by a person skilled in the art understanding the above description and need not be further explained.

The above circuit thus clearly controls the operation of a subscriber terminal in transmission of data signals to the head end, upon reception of the busy bits which are provided from a head end to all subscriber terminals. The control clearly also establishes the waiting period prior to transmission, which controls the traffic density carried by the network. With the traffic density controlled and certainty of the reliable reception of the data signal from a receiver once it has seized the network, reliable upstream transmission has been found to be obtainable.

A person skilled in the art and understanding the above description may now conceive of alternatives and variations in design, using the principles described herein. All are considered to be within the sphere and scope of the invention as defined in the claims as appended hereto.

We claim:

1. A bidirectional cable communication system comprising:
   (a) a head end,
   (b) a bidirectional transmission network connected to the head end for transmitting signals downstream from the head end to a plurality of subscriber stations and for transmitting data signals upstream to the head end from the subscriber stations,
   (c) means at the head end for detecting collisions between signals received from the subscriber stations and for generating a collision signal,
   (d) means at the head end for transmitting downstream on the transmission, network status bits of data signals indicative of said collision, whereby upon detection thereof by a subscriber station it can be enabled to cease transmission.

2. A system as defined in claim 1 in which said collision, detecting means includes means for detecting whether or not signals are being received from any subscriber station and for generating a busy or idle state signal respectively, said transmitting means generating said status bits of data signals indicative of said collision, said idle or said busy states.

3. A system as defined in claim 2 in which said status bits of data are transmitted repetitively separating time slots of downstream data signals.

4. A system as defined in claim 3 in which a maximum round trip propagation delay is defined by a sum of delays of all components in a transmission loop to a longest delayed end of the network in both the downstream and the upstream directions, a time period between successive groups of status bits being at least as long as said propagation delay.

5. A system as defined in claim 2, 3 or 4 in which the upstream data signals from each of the subscribers are in a same frequency band.

6. A system as defined in claim 2, 3 or 4 in which the upstream data signals from each of the subscribers are frequency shift keyed to similar frequencies.

7. A system as defined in claim 2, 3 or 4 in which the upstream data signals from each of the subscriber stations are in a same frequency band, and further including a narrow band filter, having a passband similar to that of said same frequency band of the upstream data signals, connected in the upstream transmission direction each in a branch of the network while allowing downstream signals to pass.

8. A system as defined in claim 2, 3 or 4 in which the upstream data signals from each of the subscriber stations are frequency shift keyed to similar frequencies, and further including a multiple narrow band filter, having passbands encompassing said similar frequencies, connected in the upstream transmission direction each in a branch of the network while allowing downstream signals to pass.

9. A system as defined in claim 1, 2 or 4 in which the signals received from the subscriber stations are frequency shift keyed at similar frequencies, and further including upstream filter having narrow bandpass frequencies encompassing said similar frequencies connected in branches of the network.

10. A subscriber terminal for use in a bidirectional cable communication system comprising:
    (a) means for repetitively receiving a data signal from a bidirectional transmission network of status bits indicative of a status of the network including signal collision, busy or idle,
    (b) means for formulating and storing a data signal to be transmitted via the network to a head end,
    (c) said transmitting means the data signal to the head end via the network,
    (d) said controlling means the means for transmitting,
    (e) the means for controlling comprising means for receiving a status bits, and for enabling transmission of the data signal with a predetermined probability P, means for counting the number of signal collision status signals received, and for adjusting the probability P in accordance therewith.

11. A terminal as defined in claim 10 in which the probability P is adjusted by reduction of a back-off factor K, where P=Pp/K and Pp is a previous probability of transmission.

12. A terminal as defined in claim 11 in which the means for controlling includes means for inhibiting transmission for a period of time if a number of signal collision status signals received exceeds a predetermined maximum, and thereupon reinitiating retransmission of a complete data signal.

13. A terminal as defined in claim 12 in which P is reset to 1 following transmission of said complete data signal.

14. A terminal as defined in claim 10 in which the controlling means includes means for repetitive extraction of successive status groups of bits from data signals in successive time slots, for decoding the status groups of bits and for providing resulting collision, busy and idle signals on corresponding lines for resulting operation of said controlling neon enabling transmission enabling means.

15. A terminal as defined in claim 10, further comprising:
    (i) a data bus,
    (ii) the means for formulating packets of data signals comprising a processor and control input therefor and the means for storing comprising a buffer memory, the processor and buffer memory being connected together via the data bus whereby the processor passes packets of data to be transmitted to the buffer memory,
    (iii) a modulator having its input connected to an output of the buffer memory for receiving the formulated data signals,
    (iv) a time out circuit for controlling a transmission interval of the data signals for receiving modulated signals from the modulator, having a control input from the controlling means, and for transmitting the data signals upstream on said network, (v) the buffer memory also including a control input from the means for controlling, whereby reception of packets of said data signals and transmission thereof on said network is controlled by said controlling means as a result of receiving the status bits and said probability P.

16. A terminal as defined in claim 15 including filter means for separating the data signals from other signals carried by the network, a digital demodulator for demodulating the data signal, a status bit extraction circuit for extracting status bits from the data signal and for applying the status bits to the controlling means.

17. A terminal as defined in claim 10, 15 or 16 in which the controlling means is comprised of means for inhibiting transmission during or prior to transmission of data signals in the event of reception of collision status bits from the transmission network.

18. A terminal as defined in claim 10, 15 or 16 in which the controlling means is comprised of means for inhibiting transmission during or prior to transmission of a data signal in the event of reception of collision status bits from the transmission network, for incrementing a collision counter, and for adjusting said probability P to a lower value in the event a count stored by the collision counter is below a predetermined maximum, and for resetting the probability P to a value which is either a predetermined or random low value number in the event said count is in excess of said predetermined maximum.

19. A terminal as defined in claim 10, 15 or 16 in which the controlling means is comprised of means for inhibiting transmission during or prior to transmission of a data signal in the event of reception of collision status bits from the transmission network, for incrementing a collision counter, and for adjusting said probability P to a lower value in a event the count stored by the collision counter is below a predetermined maximum, and for resetting the probability P to a value which is either a predetermined or random low value number in the event said count is in excess of said predetermined maximum, and for initializing the collision counter to zero and the transmission probability P to 1 following transmission of a packet of data signals.

20. A terminal as defined in claim 10, 15 or 16 in which the controlling means is comprised of means for receiving the status bits, a random number generator and a latch for latching an output of the random number generator, a collision counter for counting the number of collisions indicated by the status bits, connected to a transmitter control circuit, a factor calculating circuit having an input connected to the collision counter, and a probability register for receiving the output of the probability register, whereby a probability signal value stored in the probability register is reduced upon incrementing by the factor calculating circuit with increased collision count, the controlling means also including means for freezing the value in the latch in an event of the status bits indicating an idle channel; and a comparator for comparing a signal data value in the latch with said data value in the probability register, and to enable transmission of the data signal to the network in the event said data value in the probability register is greater than that in the latch.

21. A terminal as defined in claim 10, 25 or 16 in which the controlling means is comprised of means for receiving the status bits, a random number generator and a latch for latching an output of the random number generator, a collision counter for counting the number of collisions indicated by the status bits, connected to a transmitter control circuit, a factor calculating circuit having an input connected to the collision counter, and a probability register for receiving the output of the probability register, whereby a probability signal value stored in the probability register is reduced upon incrementing by the factor calculating circuit within increased collision count, the controlling means also including means for freezing a value in the latch in the event of the status bits indicating an idle channel; and a comparator for comparing a signal data value in the latch with said data value in the probability register, and to enable transmission of the data signal to the network in the event said data value in the probability register is greater than that in the latch, and to inhibit transmission upon subsequent reception of a collision status bit, to enable transmission of an entire data signal from its beginning, and to increment the collision counter, causing decrementing of the probability register, comparison of its value in the comparator, and enabling said transmission if said data value in the probability register exceeds said value in the latch following reception of idle status bits, and in case the number of collisions exceed a predetermined maximum, to set the collision counter to zero, to initialize the factor calculating circuit, and the probability register to 1, whereupon transmission is inhibited until retransmission with an initially low transmission probability.

22. A head end for use in a bidirectional CATV communication system comprising:

(a) a communication controller for receiving downstream data signals and for generating master data signals containing the downstream data signals, (b) a modulator for receiving various TV signals and said master data signals and for applying them in predetermined channels, to an upstream end of a coaxial cable, (c) a demodulator for receiving upstream data signals in another predetermined channel from the upstream end of the coaxial cable and for providing demodulated data signals for further processing, (d) a collision detector for receiving said data signals in said another predetermined channel from the upstream end of the coaxial cable, for detecting supervisory signals therein, for determining collisions between signals received from multiple sources downstream of the coaxial cable, and for providing an indication of said collisions in case thereof to the communication controller, and for generating supervisory signals and providing them to the communication controller.

(e) the communication controller including means for providing the latter supervisory signals as part of the master data signals, whereby in case of detection of said collisions a predetermined collision supervisory signal is generated in the collision detector and is applied to the cable in the downstream direction from which it may be detected by said multiple sources.

23. A head end as defined in claim 22 in which the supervisory signals applied to the upstream end of the coaxial cable are comprised of status data bits for designating a status of busy, idle or collision, designating that said another predetermined channel for carrying upstream data signals is busy, idle, or that multiple signals are being received at the same time and are thus polluted, said status bits being generated by the collision detector upon detection of said supervisory signals from the upstream end of the coaxial cable.

24. A head end as defined in claim 23 in which the collision detector includes means for detecting said collisions in a broadband channel.

25. A head end as defined in claim 23 in which the communications controller is comprised of means for providing a byte of the status bits and downstream data signals in a high speed data channel divided into time slots, with the byte of status bits at the beginning of each time slot, the interval between types of said status bits being at least as long as a maximum round trip propagation delay within the CATV communication system.

26. In combination with the head end as defined in claim 23, 24 or 25, a coaxial cable network having an upstream end connected to the head end, and a plurality of subscriber terminals, each subscriber terminal comprising:
(i) means for receiving said master data signals including said bytes of status bits indicative of busy, idle or collision status of an upstream data channel,
(ii) means for formulating and storing data signals to be transmitted via the network to the head end,
(iii) means for transmitting the data signals to the head end via the network,
(iv) means for controlling said transmitting means,
(v) said controlling means comprising means for receiving the status bits, and for enabling transmission of the data signals with a predetermined probability, P, means for counting the number of signal collision status signals received, and for adjusting the probability P in accordance therewith.

27. A terminal as defined in claim 26 in which the probability P is adjusted by reduction of a back-off factor K, where $P = Pp/K$ and Pp is the previous probability of transmission.

28. A terminal as defined in claim 27 in which the means for controlling includes means for inhibiting transmission for a period of time if a number of signal collision status signals received exceeds a predetermined maximum, and thereupon reinitiating retransmission of a complete data signal.

29. A terminal as defined in claim 28 in which P is reset to 1 following transmission of the complete data signal.

30. A terminal as defined in claim 2 in which the controlling means includes means for repetitive extraction of successive status groups of bits from data signals in successive time slots, for decoding the status groups of bits and for providing resulting collision, busy and idle signals on corresponding lines for resulting operation of said controlling means enabling transmission of the data signal with said predetermined probability.

* * * * *